N. W. HIBBS.
SOLDERING IRON APPARATUS.
APPLICATION FILED APR. 15, 1918.

1,295,750.

Patented Feb. 25, 1919.

UNITED STATES PATENT OFFICE.

NELSON W. HIBBS, OF THE UNITED STATES NAVY, ASSIGNOR TO THE GOVERNMENT OF THE UNITED STATES.

SOLDERING-IRON APPARATUS.

1,295,750.  Specification of Letters Patent.  Patented Feb. 25, 1919.

Application filed April 15, 1918. Serial No. 228,804.

*To all whom it may concern:*

Be it known that I, NELSON W. HIBBS, lieutenant, United States Navy, a citizen of the United States, residing at Newport, in the State of Rhode Island, have invented new and useful Improvements in Soldering-Iron Apparatus, of which the following is a specification.

This invention relates to a soldering apparatus and the method of using the same, and is particularly adapted for use in soldering containers of explosives or gaseous and volatile materials where high temperatures would be dangerous or inadvisable.

One of the objects of the present invention is to provide a simple and practical apparatus particularly adapted for use in soldering mines containing explosives, for example, in which the temperature of the soldering iron proper may be accurately maintained. Another object is to provide a soldering apparatus of the above general character having relatively few parts which may be inexpensively manufactured and assembled. A further object is to provide a process of simple and practical character for soldering containers of explosive materials in an efficient and reliable manner.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; as well as the steps of the process and the interrelation of such steps; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1:
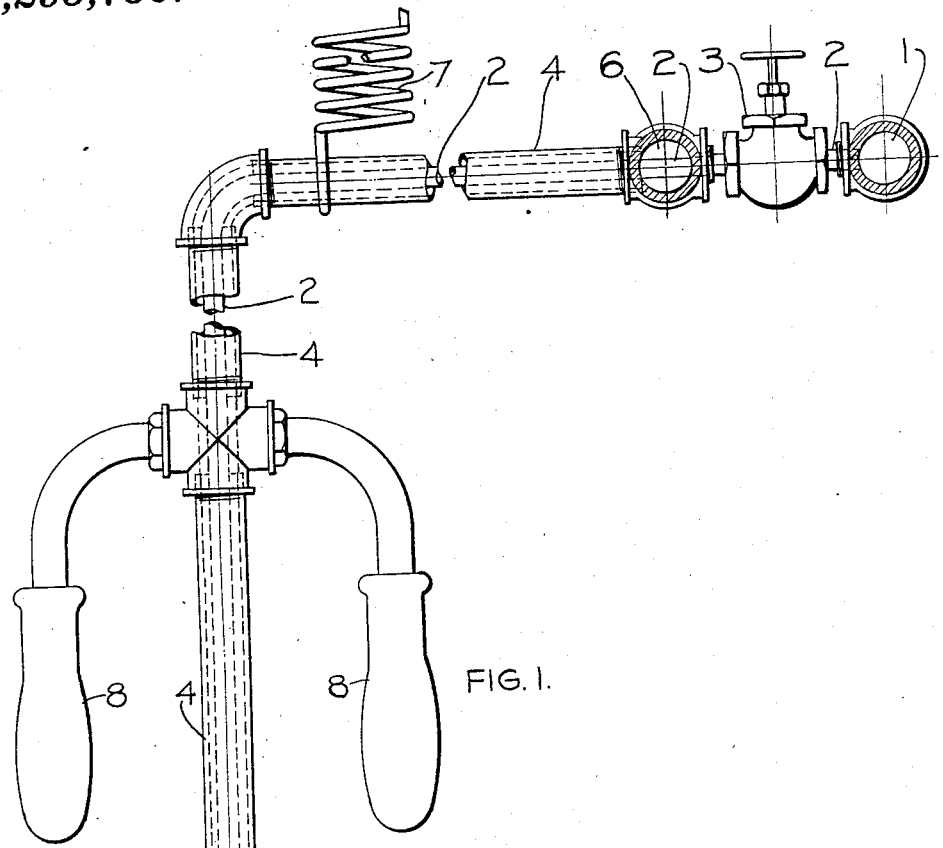
Figure 1 is an elevational view partly in section showing such parts of the complete apparatus as are necessary to fully understand the invention.

Referring now to the drawings in detail, 1 denotes a main source of steam supply, superheated steam being used, if desired, for very high temperatures, from which projects a small diameter pipe 2 provided with a valve or other suitable controlling mechanism 3. This pipe 2 passes through, or is concentrically disposed with respect to a larger insulating pipe 4, connected with a main exhaust pipe 6, the pipes being connected at their free ends to the chamber 12 of the soldering iron 5, through side 11 thereof, opposite soldering point 10.

The device shown in Fig. 1 is adapted to be flexibly supported by means of a spring 7 and the iron may be manipulated as desired by means of handles 8 at each side of the soldering iron 5. It will be noted on reference, particularly to Fig. 2, that the soldering iron point is relatively sharp and substantially V-shaped, which permits the same to be inserted in relatively small angles and corners, convenient manipulation being further facilitated by the concave upper face 14. The supply pipe 2 is led into the chamber 12 of the soldering iron through the side 11 thereof, and is so positioned with respect to this point as to impinge a jet of live steam directly thereon, whereby it is heated to the desired temperature. The steam is then conducted back through the larger pipe 4 to the main exhaust pipe 6.

Figure 2:
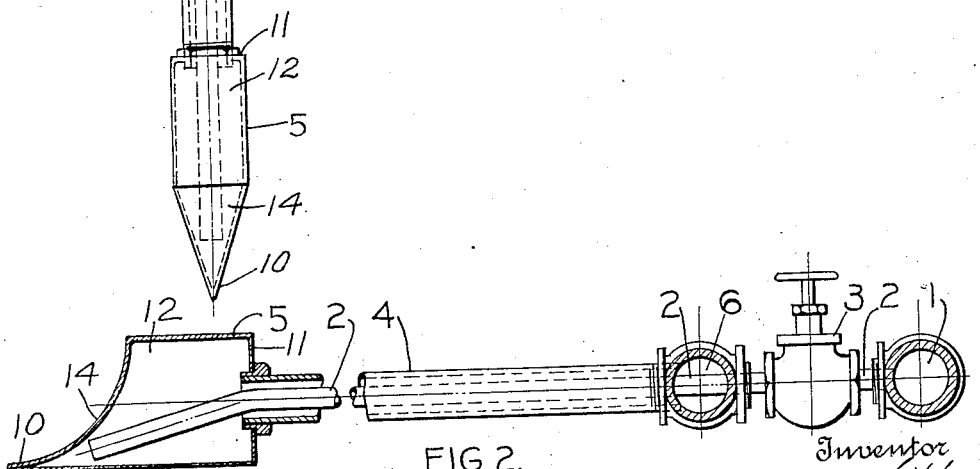
Fig. 2 is a partial sectional view of a portion of a slightly modified apparatus showing the soldering tool in section.

While substantially rigid piping is shown in Fig. 2, capable of only slight vertical and horizontal movement, it is, of course, to be understood that flexible tubing or hose may be used throughout in both embodiments shown in the drawing.

The method of operating a device of this character is substantially as follows:—The container to be operated upon is moved adjacent the apparatus, as shown in Fig. 1, for example, after which the valve 3 is opened permitting the live or super-heated steam from the conduit 1 to pass directly through the pipe 2 to the soldering point 5, which is thereby heated to a temperature approximating that of the temperature of the steam used. As the melting point of solder varies from a point below the boiling point of water to 500° or 600° Fahrenheit, according to the percentage of tin or the addition of bismuth in its composition, it will be seen that if a solder having a low melting point is applied to the seam, the same will be melted easily and quickly, though in some cases, according to the nature of the solder, a high temperature may be necessary in order to melt the solder. It will be understood that in any case the heat from the melting solder will be taken up and radiated by the metal of the container adjacent to the seam, before the contents of the container can be materially affected.

It is thus seen that the present invention provides a simple and practical apparatus particularly adapted for the use herein set forth, which will be reliable and efficient in operation. It also provides a means for soldering material in close contact with explosive compounds, gases or volatile fluids, where the use of the ordinary soldering means of applying a flame or electricity as a heating agency, would be dangerous.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim as my invention:

1. A portable soldering tool having a hollow body member provided with a soldering point, a steam pipe for supplying steam to a point closely adjacent said soldering point and a concentric hollow tube surrounding the first mentioned pipe permitting the exhaust of steam from the hollow member.

2. A portable soldering tool having a hollow body member provided with a soldering point, a steam pipe for supplying steam to a point closely adjacent said soldering point, and a concentric hollow tube of heat insulating material surrounding the first mentioned pipe permitting the exhaust of steam from the hollow member, said steam pipe and exhaust tube constituting the only means communicating with said hollow member.

3. A portable soldering tool having a hermetically closed hollow body having a soldering point provided with a concave upper face, a pipe for supplying steam to a point closely adjacent said soldering point and a concentric hollow tube surrounding the first mentioned pipe permitting the exhaust of steam from the hollow member.

4. A portable soldering tool having a hollow body member provided with a soldering point, a pipe extending into said member and terminating immediately adjacent said point for supplying steam directly thereto and a concentric hollow tube surrounding the first mentioned pipe permitting the exhaust of steam from the hollow member and terminating in the wall of said body member opposite said point.

5. A portable soldering tool having a hermetically closed hollow thin metal body member provided with a soldering point having a concave upper face, a pipe extending into said member and terminating immediately adjacent said point for supplying steam directly thereto and a concentric hollow tube of heat insulating material surrounding the first mentioned pipe permitting the exhaust of steam from the hollow member, said tube terminating in the wall of said body member opposite the said soldering point.

Signed at Newport, in the county of Newport, and State of Rhode Island, this 4th day of April 1918.

NELSON W. HIBBS.

Copies of this patent may be obtained for five cents each, by addressing the "Commissioner of Patents, Washington, D. C."